(12) United States Patent
McLaughlin

(10) Patent No.: US 10,834,919 B2
(45) Date of Patent: Nov. 17, 2020

(54) CRYOPRESERVATION INSTRUMENT AND METHOD OF USING SAME

(71) Applicant: THE RESEARCH INSTITUTE AT NATIONWIDE CHILDREN'S HOSPITAL, Columbus, OH (US)

(72) Inventor: Kenneth John McLaughlin, Columbus, OH (US)

(73) Assignee: Research Institute at Nationwide Children's Hospital, Columbus, OH (US)

( * ) Notice: Subject to any disclaimer, the term of this patent is extended or adjusted under 35 U.S.C. 154(b) by 425 days.

(21) Appl. No.: 15/509,328

(22) PCT Filed: Sep. 2, 2015

(86) PCT No.: PCT/US2015/048022
§ 371 (c)(1),
(2) Date: Mar. 7, 2017

(87) PCT Pub. No.: WO2016/040063
PCT Pub. Date: Mar. 17, 2016

(65) Prior Publication Data
US 2017/0280708 A1 Oct. 5, 2017

Related U.S. Application Data

(60) Provisional application No. 62/047,356, filed on Sep. 8, 2014.

(51) Int. Cl.
*A01N 1/02* (2006.01)

(52) U.S. Cl.
CPC ......... *A01N 1/0268* (2013.01); *A01N 1/0221* (2013.01); *A01N 1/0284* (2013.01)

(58) Field of Classification Search
CPC .. A01N 1/0268; A01N 1/0221; A01N 1/0284; A45D 40/265
See application file for complete search history.

(56) References Cited

U.S. PATENT DOCUMENTS

| | | | | |
|---|---|---|---|---|
| 2,348,515 A | * | 5/1944 | Baumgartner | ........... A46B 3/16 15/195 |
| 3,640,268 A | * | 2/1972 | Davis | ...................... A61B 10/02 600/572 |

(Continued)

FOREIGN PATENT DOCUMENTS

| | | | | |
|---|---|---|---|---|
| WO | WO 2008/129409 | | 10/2008 | |
| WO | WO-2008129409 A1 | * | 10/2008 | ........... B65D 41/185 |

OTHER PUBLICATIONS

International Search Report and Written Opinion of the International Searching Authority for International App. No. PCT/US15/48022 dated Dec. 2, 2015 (10 pages).

*Primary Examiner* — William H. Beisner
(74) *Attorney, Agent, or Firm* — Tarolli, Sundheim, Covell & Tummino LLP; John A. Yirga, Esq.

(57) ABSTRACT

A cryopreservation instrument and method of using is provided. The instrument includes a substantially planar elongated member comprising a cryosafe material. The elongated member has a first end and a second end. The first end comprises a cap insert dimensioned and configured to be fit in the interior recess of a vial cap, the second end comprises a biological contact portion configured to accommodate biological material.

24 Claims, 7 Drawing Sheets

(56) References Cited

U.S. PATENT DOCUMENTS

| | | | |
|---|---|---|---|
| 4,036,385 A * | 7/1977 | Morris | B65D 50/046 |
| | | | 215/209 |
| 4,859,610 A | 8/1989 | Maggio | |
| 5,260,031 A * | 11/1993 | Seymour | A61B 5/411 |
| | | | 422/419 |
| 5,543,115 A * | 8/1996 | Karakawa | B01L 3/508 |
| | | | 422/535 |
| 2002/0110907 A1 | 8/2002 | Wisniewski | |
| 2006/0094325 A1 | 5/2006 | Thai | |
| 2006/0234204 A1 * | 10/2006 | Forest | A01N 1/02 |
| | | | 435/1.3 |
| 2007/0167900 A1 * | 7/2007 | Kanjilal | A61B 10/0038 |
| | | | 604/1 |
| 2011/0239791 A1 | 10/2011 | Fici | |

\* cited by examiner

CRYOPRESERVATION INSTRUMENT AND METHOD OF USING SAME

CROSS-REFERENCES TO RELATED APPLICATIONS

The present application is a 35 U.S.C. § 371 National State Patent Application of International PCT Application Serial Number PCT/US2015/048022 having an International filing date of 2 Sep. 2015 and that was published on 17 Mar. 2016 under International publication number WO 2016/040063, The following application and claims priority under 35 U.S.C. § 119(e) to U.S. Provisional Application Ser. No. 62/047,356 that was filed on 8 September 2014 entitled CRYOPRESERVATION INSTRUMENT AND METHOD OF USING SAME. The above-identified priority applications and publication are incorporated herein by reference in entireties for all purposes.

TECHNICAL FIELD

The present subject matter is related to a universal cryopreservation instillment that fits securely into a cap, or other portion, of a cryostorage device, e.g., a cryopreservation vial, tube, or the like, as well as methods of using the same.

BACKGROUND

Long-term preservation of biological material, including: e.g., cells and tissues, is commonly performed in multiple fields, including, e.g., tissue engineering, fertility and reproductive medicine, regenerative medicine, stem cells, blood banking, animal strain preservation, clinical sample storage, blood and tissue engineered constructs (TECs), transplantation medicine and in vitro drug testing. Such preservation may be achieved by traditional cryopreservation by vitrification. Cryopreservation, particularly the cryopreservation of biological samples, refers to the freezing/vitrification of tissues or cells in order to preserve them for future use. Vitrification, a rapid cooling process that results in a glass structure at the molecular level, eliminates ice crystal formation and results in improvement in post-thaw cell viability and function compared to the traditional freezing methods.

SUMMARY

Various instruments are commonly used when cryopreserving or vitrifying a biological sample. For example, cryopreservation vials ("cryovials") or cryopreservation tubes ("cryotubes") are often used for storing or freezing a biological sample. A cryopreservation instrument, such as, for example, a vitrification spatula, loop, mesh, net, straw or the like may also be used during cryopreservation or vitrification. However, there is a need for a universal cryopreservation instrument that fits, via a friction fit, slip fit, or the like, between the interior walls of the cap of a cryopreservation receptacle, such as a cryovial, cryotube, or the like.

Accordingly, provided herein is a cryopreservation instrument that comprises or consists of a substantially planar elongated member comprising a cryosafe material. The elongated member has a first end and a second end. The first end comprises or consists of a cap insert dimensioned and configured to be fit in an interior recess of a vial cap. The second end comprises a biological contact portion configured to accommodate biological material.

The cap insert may include two or more parallel projections extending from the first end the elongated member. The two or more substantially parallel projections may be coplanar with the elongated member. In addition, parallel projections may define a void therebetween; thereby, allowing for give or flex upon the application of pressure to the parallel projections.

The cap insert may also include a portion having a width greater than an internal diameter of the vial cap it can be inserted into. In such a case a friction, or slip fit may be achieved upon insertion of the cryopreservation instrument into the vial cap. Likewise, the cap insert may be deformable under pressure sufficient to allow insertion of the cap insert in the interior recess of the vial cap. In addition, the parallel projections may be independently yieldable and resilient, and/or integral with the elongated member.

The cap insert may be in other structural forms suitable to fit tightly in the interior recess of a cap. For example, the cap insert may be a solid, but, flexible resilient, deformable or elastic material.

Regardless of final configuration the cap insert may comprise one or more resilient, deformable or elastic material, which, may be the same or different from the remainder of the cryopreservation instrument.

Any material utilized in the cryopreservation installment may be a cryosafe material. Non-limiting examples of cryosafe materials include, e.g., polycarbonate, polystyrene, polypropylene, glass, acrylic, aluminum, beryllium copper, stainless steel, Teflon® (polytetrafluoroethylene), a polyimide, low-density polyethylene (LDPE), low-density polyethylene (HDPE), polyethylene terephthalate (PET), polyethylene terephthalate glycol-modified (PETG), ultra-high-molecular-weight polyethylene (UHMWPE), a silicone based polymer, Diphenylmethylsilyl ether (DPMS), polychlorotrifluoroethylene PCTFE and/or polyimides, as well as combinations thereof. The biological contact portion of the cryopreservation instrument is configured sufficient to accommodate any biological contact portions including, e.g., a thin tip, a vitrification spatula, a loop, a mesh, a net, and a straw.

The cryopreservation instrument may also comprise a substantially planar elongated member comprising a cryosafe material. The substantially planar elongated member may comprise a first end being dimensioned and configured to be removably receivable within a recess portion of a cap with little relative clearance. The substantially planar elongated member may also comprise a second end configured to receive a biological specimen, the first end and second end defining an axis.

In addition, the end may comprise at least two spaced apart parallel projections extending from the first end, the projections being parallel to the axis and coplanar therewith, and defining a void therebetween. The parallel projections may engage the recess portion with an oppositely biased friction fit.

In addition, the parallel projections may be independently yieldable and resilient, and/or integral with the elongated member.

Also provided is a met hod of preserving a sample that includes providing a cryopreservation instrument comprising a substantially planar elongated member having a first end and a second end, the first end comprising a cap insert dimensioned and configured to be fit in the interior recess of a vial cap, the second end comprising a biological contact portion configured to accommodate biological material. The method also may include inserting the cap insert into an externally threaded vial cap comprising an interior recess, to produce a cryo-tool having a cap end and the biological contact portion. The method may also include loading biological material onto the biological contact portion of the cryo-tool. Additionally, the method may include placing the biological contact portion of the cryo-tool into liquid nitrogen to obtain cryopreserved biological material. The method may also include maintaining the cryopreserved biological material on the cryo-tool and placing the cryo-tool into an internally threaded vial being threadably engagable with the vial cap. Furthermore, the method may include allowing the cryopreserved biological material to equilibrate with the conditions in the vial. In addition, the method may include screwing the vial cap onto the vial to obtain a sealed vial.

In some cases, the biological solution may be exposed to a cryopreservation solution prior to being placed in liquid nitrogen. Exposure may be in any suitable known in the art, including directly pouring or dropping the solution onto the biological material either before or after it is accommodated by the cryopreservation instrument.

The cryopreservation solution may comprise or consist of one or more known cryoprotectants and/or a carrier solution, e.g., a balanced salt solution. Suitable cryoprotectants include both intracellular and extracellular cryoprotectants. Non-limiting examples of intracellular cryoprotectants include, e.g., DMSO, glycerol, ethylene glycol, polyethylene glycol, 1,2-propanediol and/or formamide. Non-limiting examples of extracellular cryoprotectants include, e.g., sugars, proteins and/or carbohydrates.

According to the present subject matter, the cap insert may comprise two or more substantially parallel projections extending from the first end oft e elongated member. The two or more substantially parallel projections being may be substantially coplanar with the elongated member. Further, the substantially parallel projections may define a void therebetween.

The cap insert may be in other structural forms suitable to fit tightly in the interior recess of a cap. For example, the cap insert may be a solid material, including for example, a flexible, resilient, deformable, and/or elastic solid material.

The cap insert may comprise at least a portion having a width greater than an internal diameter of the cap that it is intended to be inserted into.

Regardless of final configuration the cap insert may comprise one or more resilient, deformable or elastic materials, which may be the same or different from the remainder of the cryopreservation instrument.

Inserting may further comprise or consist of inserting the cap insert under pressure into the interior recess of the vial cap such that the cap insert deforms under pressure sufficient to allow insertion of the cap insert into the interior recess of the vial cap.

Once sealed, the vial may be stored under conditions sufficient to maintain any amount of post-thawing viability under cryopreservation conditions, including 10%, 20%, 30%, 40%, 50%, 60%, 70%, 80%, 90%, 95, 98%, or 99%. In this regard, the vial may be stored in liquid nitrogen, liquid nitrogen vapor, any known freezing device or the like.

One aspect of the present disclosure includes a cryopreservation instrument and method of using the instrument. The instrument has a substantially planar elongated member comprising a cryosafe material. The elongated member includes a first end and a second end. The first end comprises a cap insert dimensioned and configured to be fit in the interior recess of a vial cap, the second end comprises a biological contact portion configured to accommodate biological material.

Another aspect of the present disclosure includes cryopreservation instrument comprising a substantially planar elongated member formed from a cryosafe materid. The elongated member has a first end and a second end. The first end comprises a cap insert dimensioned and configured to be fit in the interior recess of a vial cap. The second end comprises a biological contact portion configured to support biological material. The first end further comprises substantially parallel first and second guides symmetrically spaced from the biological contact portion.

DETAILED DESCRIPTION

Definitions

Figure 1:
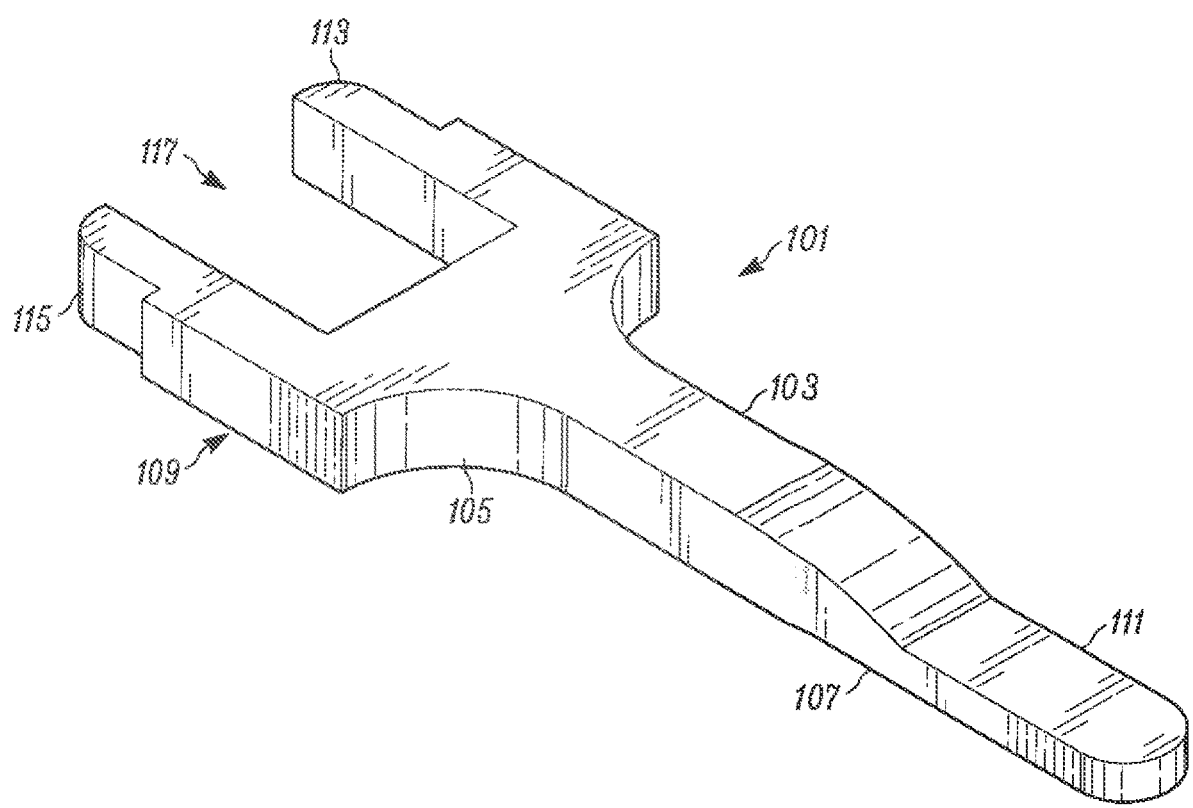
FIG. 1 is a representation of a cryopreservation instrument according to one example embodiment of the present disclosure.

The terms "about" or "substantially" as used herein refers to a quantity, level, value, dimension, size, or amount that varies to some extent based on the context in which it is used. For example, such variation can be by as much as 5%. At the least, each numerical parameter can be construed in:light of the number of reported significant digits and by applying ordinary rounding techniques.

As used herein, "biological material" may refer to any material of biological origin. Such material can include material containing genetic information and capable of reproducing itself or being reproduced in a biological system. Non-limiting examples of biological material include, but are not limited to, one or more of the following; blood; urine; saliva; other bodily fluids; tissue; hair; nails; placentas; umbilical cords; sperm; embryos; gametes; oocytes; products of conception; excess pathology tissue; and waste surgical tissue.

As used herein, "cryopreservation" refers to storage of a biological material, including at extremely cold temperatures, e.g., at about –196 degrees Celsius.

As used herein "cryopreservation conditions" refers to any set of conditions typically recognized as useful in the art for cryopreserving cells. Accordingly, cryopreservation conditions can simply refer to an environment providing a "cryopreservation temperature", or a temperature sufficiently below zero degrees Centigrade (below 273 K) to slow or stop biological activity within a cell, including but not limited to biochemical reactions within the cell that would lead to cell death. A cryopreservation temperature may include a temperature of less than about –20° C. (253 K), less than about –50° C. (223 K), less than about –80° C. (193 K), less than about –100° C. (173 K), or less than about −130° C. (143 K). As used herein, the term "cryopreserved state" means a state of being at a cryopreserved temperature.

Any freezing apparatus capable of providing prolonged sub-zero temperatures to maintain a cryopreserved state can be used according to the present invention. When liquid nitrogen is used, the cryopreservation temperature typically approaches the boiling point of nitrogen, or about −196° C. (77° K). Freezing and storage may be carried out in the same apparatus, or a first freezing apparatus may be used prior to transfer of frozen samples to a long-term storage apparatus. Liquid nitrogen storage vessels are typically used. Freezers typically cool a sample to a temperature of around −80° C. (193° K). Any such methods and apparatuses may be used according to the present subject matter.

Cryopreservation conditions can farther refer to the use of additives, or physical conditions, for promoting vitrification, which decreases damage due to ice crystal formation. For example, cryopreservation conditions according to the invention can comprise adding to the cells a cryoprotectant. Preferably, the cryoprotectant is effective for lowering the freezing temperature of the cell suspension, increasing the viscosity of the cell suspension, or both. Vitrification is generally understood to refer to hardening (to a glass-like state) without formation of ice crystals. Vitrification is promoted by rapid cooling, and can be achieved without cryoprotectants by an extremely rapid drop in temperature (typically megakelvins per second).

Any cryoprotectant recognized as useful in the art for cryopreservation of cells can also be used according to the present subject matter. The cryoprotectant may include a solute capable of penetrating the cell membrane of the cells for cryoprotection in order to achieve increased viscosity and depressed freezing temperature inside the cell. One of the first compounds found useful as a cryoprotectant was glycerol. Dimethyl Sulfoxide (DMSO) is also recognized as a useful cryoprotectant. DMSO passes through cell membranes more readily than glycerol, but it can be more toxic at higher temperatures. Nevertheless, the most commonly used cryoprotectant today is DMSO such as at a final concentration of 5% or 10%, however, this is not appropriate for all cell lines e.g. HL60 where DMSO is used to induce differentiation. In such cases an alternative such as glycerol can be used (reference can be made to the European Collection of Cell Cultures (ECACC) data sheet for details regarding the types of cryoprotectants that can be used with specific cell lines). Ready-made cell freezing media are widely available (e.g., a combination of DMSO glycerol, and a semen-free formulation containing DMSO is available from Sigma). Other cryoprotectants, such as methoxylated compounds, are also used in cryoprotection and are often considered less toxic and more penetrating. Still further examples of cryoprotectants include ethanol, ethylene glycol, 2-methoxy ethanol, 1,2-dimethoxyethane, propylene glycol, 1-methoxy]-2-propanol, and glycerol derivatives, such as 3-methoxy-1,2-propanediol or 1,3-dimethoxy-2-propanol.

Various mixtures of such known cryoprotectants alone, or in combination with further compounds, can also be used in cryoprotection methods of the invention. For example, U.S. Pat. No. 6,395,467 describes cryoprotectants formed of DMSO, an amide (such as formamide, urea, acetamide, hydroxyurea, N-methyl formamide), and ethylene glycol or ethylene glycol in combination with propylene glycol. U.S. Patent Application Publication No. 2002/0042131 describes cryoprotectants prepared without the use of DMSO formamide. Such cryoprotectant formulations are generally based on diols, such as propane-1,2-diol, and can further include compounds, such as sodium chloride, potassium chloride, potassium phosphate monobasic, potassium phosphate dibasic, sodium bicarbonate, and glucose.

The concentration of penetrating cryoprotectants (such as DMSO), and hence the toxicity of the cryoprotectant cocktail, can be reduced by use of non-penetrating cryoprotectants, such as large molecular weight polymers (e.g., polyvinylpyrrolidone or polyethylene glycol) or sucrose.

The term "cryosafe material" refers to any material capable of withstanding cryopreservation conditions without substantial degradation. Suitable cryosafe materials include, polycarbonate, polystyrene, glass, acrylic and combinations thereof.

"Vitrification" means solidification without freezing and is a form of cryopreservation. Vitrification can be brought about in living systems, such as isolated human or other animal organs, by replacing large fractions of the water in these systems with cryoprotective agents (also known as cryoprotectants) whose presence inhibits crystallization of water (i.e., ice formation) when the system or organ is cooled.

Vitrification can be assisted by substances other than cryoprotective agents. For example, carrier solutions can reduce the amount of cryoprotectant needed to vitrify. The carrier solution described in Cryobiology, 27(5):492.5-510 (1990) is a mixture of salts, dextrose, and glutathione, and is based on the so-called RPS-2 solution used for storing rabbit kidneys. A carrier solution can substitute for water, but is typically only used in a 2-5% range. The carrier solution effect is largely colligative—i.e., molecules getting in the way of water molecules that might otherwise form ice. A good carrier solution will be non-toxic and by reducing the amount of cryoprotectant needed to vitrify will reduce toxicity from the cryoprotectant.

Another source of assistance for vitrification comes from ice blockers. While cryoprotectants slow ice-crystal growth and formation, ice blockers act specifically against the formation of the ice nuclei that are necessary for freezing to begin. Ice crystals can grow along six symmetric axes: the a-axes, six axes in the same plane; or the c-axis, which is perpendicular to the plane of the six a-axes. Ice crystal growth at higher temperatures typically occurs along the a-axes, which accounts for the familiar hexagonal shape of snowflakes. Ice blockers can act by three mechanisms: (1) bind to and inactivate heterogeneous nucleating substances, (2) block a-axis growth or, (3) block c-axis growth. Proteins can be useful as ice blockers, and such "anti-freeze proteins" often rely on amino acids, such as threonine and serine to hydrogen-bond with ice to prevent crystal formation (Cryobiology, 41(4):257-279 (2000)). The benefits from ice-blockers can be very great. Toxicity increases exponentially as the cryoprotectant concentrations reach the high levels needed to vitrify. While many cryoprotectants become too viscous to perfuse well at high concentrations, ice blockers typically add little to overall viscosity. Thus, the combination of an ice-blocker with a cryoprotectant can produce a solution that can both perfuse and vitrify.

The term "viable" in the context of this invention means the biological material is capable of surviving provided that they are given the necessary conditions (e.g. nutrients, temperature and the like). When applied to frozen cells/tissue or other biological material, the term "viable" denotes such cells or tissues that are capable of remaining viable after being thawed.

The term "frozen", in the context of this invention, means being or becoming a solid that comprises ice crystals at a temperature in which all biological processes are practically ceased.

The term "freezing temperature" in the context of this invention means a temperature below which a liquid to crystal phase transition occurs.

The term "vial" in the context of this invention means any sort of container or receptacle capable of containing biological material and capable of withstanding the freezing and/or thawing of the invention, such that the biological material may be protected from spillage and/or contamination. Non-limiting examples of such receptacles are tubes, bags, vials and laboratory dishes.

The term "cryopreservation solution" refers to any solution or media in which biological material is immersed before cryopreservation. Typically, cryopreservation solutions contain a balanced salt solution such as phosphate buffered saline and at least one cryoprotectant. Cryoprotectants are substances that reduce the damage incurred by the cells or tissues during freezing and/or thawing. Most freezing solutions are composed of intracellular cryoprotectants (e.g. DMSO, glycerol, ethylene glycol, polyethylene glycol, 1,2-propanediol, formamide) and/or extra cellular cryoprotectants (Sugars, proteins, carbohydrates such as: Hydroxy Ethyl Starch, dextran, etc.). Some optional cryopreservation solutions do not comprise glycosaminoglycans.

Any concentration ranges, percentage range, or ratio range recited herein are to be understood to include concentrations, percentages or ratios of my integer within that range and fractions thereof, such as one tenth and one hundredth of an integer, unless otherwise indicated.

Any number range recited herein relating to any physical feature, such as polymer subunits, size or thickness, are to be understood to include any integer within the recited range, unless otherwise indicated.

It should be understood that the terms "a" and "an" as used above and elsewhere herein refer to "one or more" of the enumerated components. It will be clear to one of ordinary skill in the art that the use of the singular includes the plural unless specifically stated otherwise. Therefore, the terms "a," "an" and "at least one" are used interchangeably in this application. For example, "a" thickener refers to both one thickener or a mixture comprising two or more thickeners.

Unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained.

Throughout the application, descriptions of various embodiments use "comprising" language; however, it will be understood by one of skill in the art, that in some specific instances, an embodiment can alternatively be described using the language "consisting essentially of" or "consisting of".

For the purpose of clad any element or feature of any method or composition described herein, can be combined with any other element or feature of any other method or composition described herein.

Turning to FIG. 1, shown is a cryopreservation instrument 101. The cryopreservation instrument 101 includes a substantially planar elongated member 103 that has a first end 105 and a second end 107. The first end 105 includes a cap insert 109 that is dimensioned and configured to be fit in the interior recess of a vial cap. The second end includes a biological contact portion 111 configured to accommodate biological material.

While the shown elongated member 103 is substantially planar, other configurations are also possible. For example, the elongated member may be a curved, bent, elliptical or other shape.

As shown in FIG. 1, the cap insert 109 includes a first parallel projection 113 and a second parallel projection 115, which extend from the first end 105 of the elongated member 103. The parallel projections (113 and 115) are substantially parallel to each other and void 117 is defined between the parallel projections(113 and 115). The parallel members projections (113 and 115) are also coplanar with each other and the elongated member 103.

The cap insert 109 may, however, be in any configuration suitable to form as tight or secure fit in the interior recess of a vial cap. For example, the cap insert may be a single, solid projection, which may or may not be planar with the elongated member 103. The cap insert 109 may include at least a portion which has a width greater than an internal diameter of a vial cap that it is to be inserted in.

Upon insertion of the cap insert 109, the vial cap will engage the cap insert in a removably receivable manner. The cap insert should be securely engaged with the cap to prevent dislodgment without substantial force. In this regard, once inserted into a vial cap the cap insert should form a friction fit, slip fit, snap fit, or the like. The fit may be oppositely biased. Once fit, the cryopreservation instrument 101 should require significant force, i.e., more than minimal, to be adjusted or moved. However, removal and reuse of the cryopreservation instrument 101 is expected.

Shown in FIG. 1, the biological contact portion 111 may be a thin tip, capable of accommodating any biological material for cryopreservation or vitrification. The biological contact portion 111 may be any structure capable of accommodating a biological material including, without limitation a thin tip, a vitrification spatula, a loop, a mesh, a net, and/or a straw.

The cryopreservation instrument 101 may be formed from any material suitable for cryopreservation and vitrification. It may be a single material or multiple materials. For example, the biological contact portion 111 may be a different material than the rest of the elongated member 103. Likewise, the cap insert 109 may be the same material or a different material than the rest of the elongated member 103.

Figure 2:
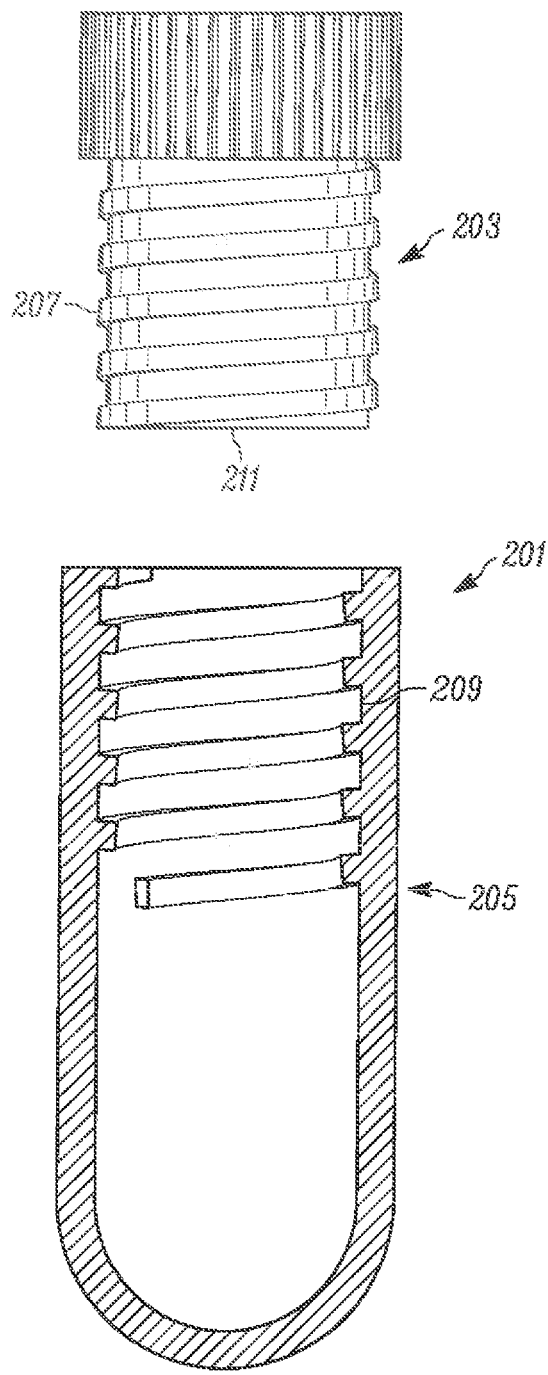
FIG. 2 is a representation of a standard ego-vial and cap having external threading.

FIG. 2 shows one form of a standard vial 201 used for cryopreservation. As can be seen, the standard vial 201, includes a cap 203 and vial/receptacle 205. The cap 203 has external threads 207 or threading, that correspond to internal threads 209 on the vial 205. The cap 203 also has an interior recessed portion 211 that is substantially hollow.

Figure 3:
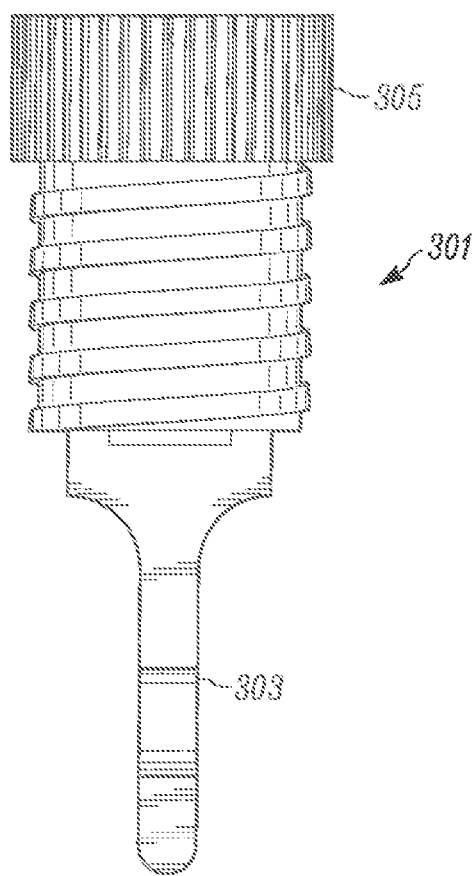
FIG. 3 is a representation of a cryopreservation instrument inserted and maintained in the interior recess of a standard externally threaded cryo-vial cap.

FIG. 3 is a representation of the cryopreservation instrument 303 inserted and tightly fit into the recess portion of a cap 305. Once engaged, the instrument 303 and cap form a cryo-tool 301. The construction and positioning of the cap insert 109 into the recess portion 211 of the cap 203 allows the contact portion 111 to remain substantially centrally located within the receptacle 205. Thus, a reduction of contamination to the contact portion 111 is advantageously mitigated.

Figure 4:
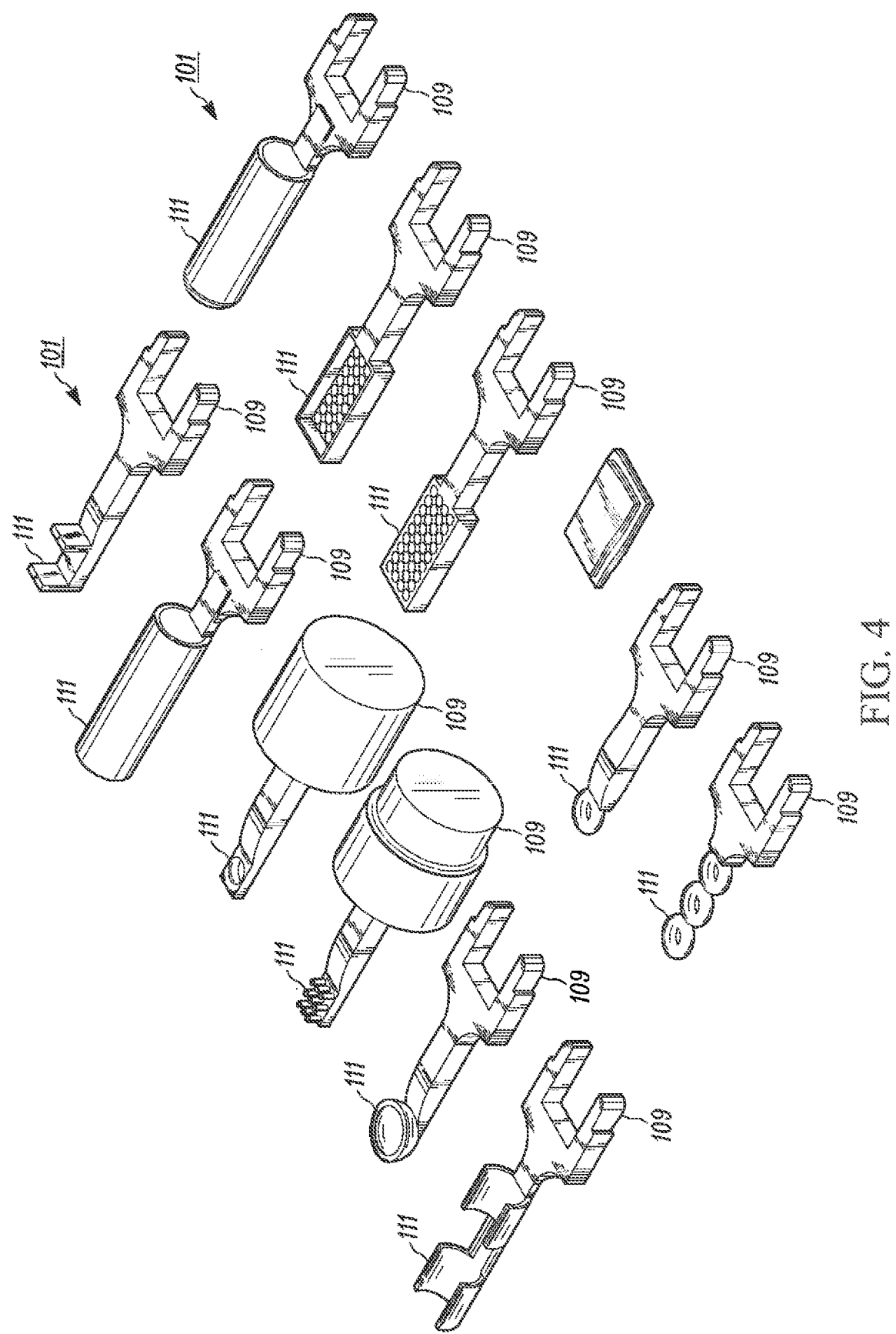
FIG. 4 is a representation of several different cryopreservation instruments according to the presently claimed subject matter.
Figure 5:
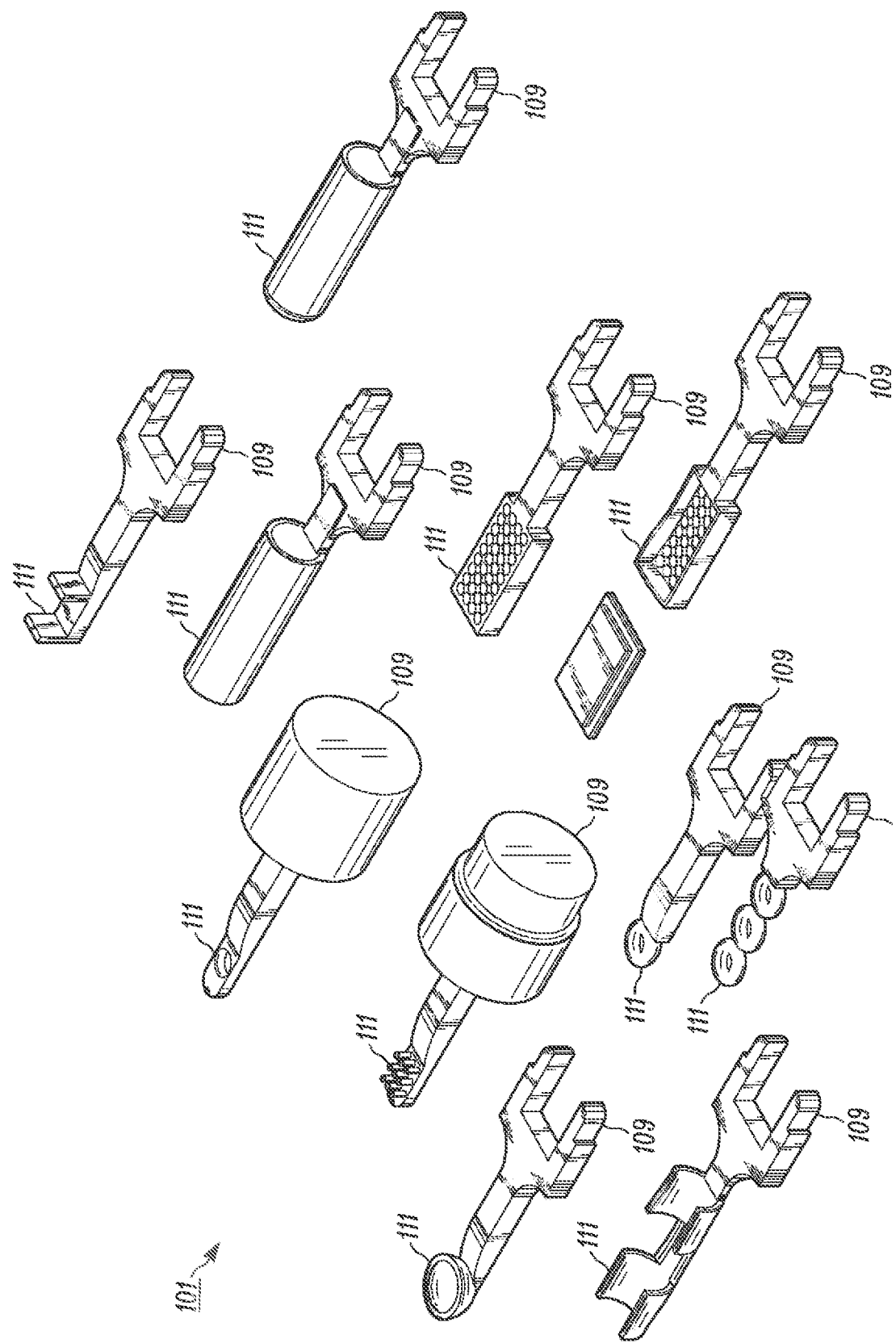
FIG. 5 is a representation of another view of the cryopreservation instruments shown in FIG. 4.
Figure 6:
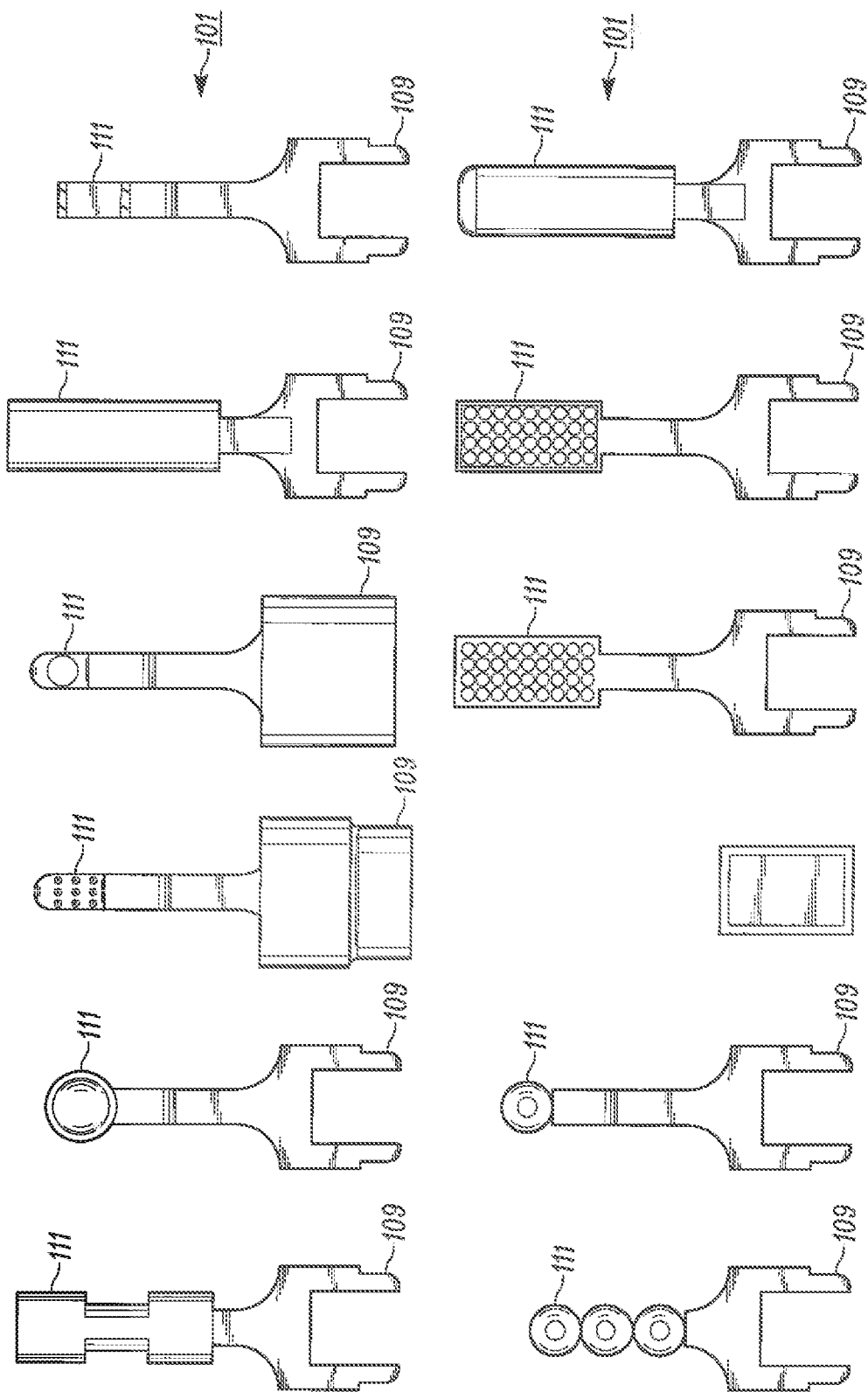
FIG. 6 is a yet another view cryopreservation instruments shown in FIG. 4.

FIGS. 4-6 show additional cryopreservation instruments according to the present subject matter. As shown, the cryopreservation instrument may be configured in any manner suitable: (1) to accommodate biological material; and (2) to fit in the interior recess of a vial cap. In this regard, FIGS.

4-6 show instruments with several different biological contact portions as well as varying cap inserts. Each of the various biological contact portions are interchangeable with the different cap inserts.

Figure 7:
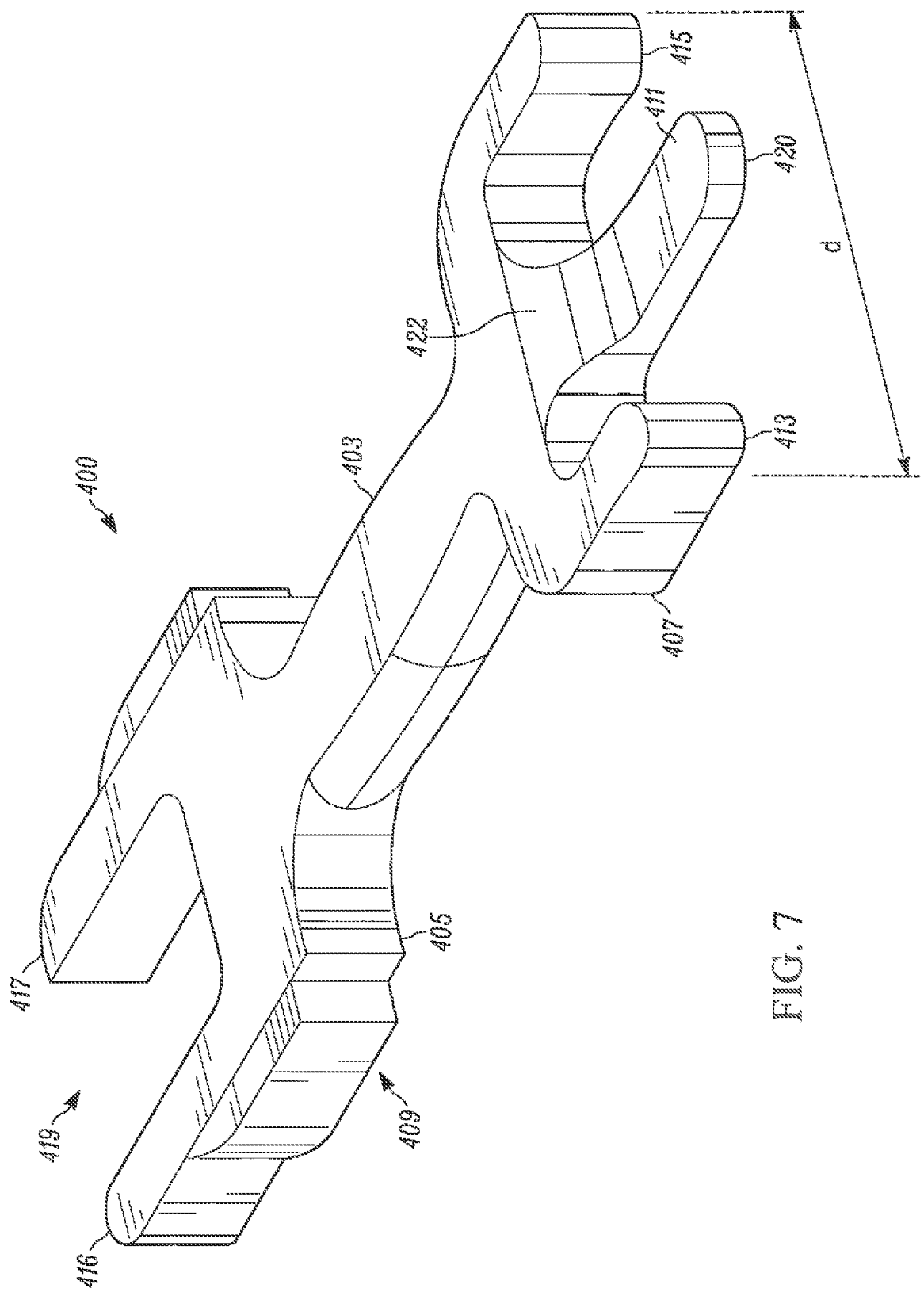
FIG. 7 is a representation of a cryopreservation instrument according to one example embodiment of the present disclosure.

Referring now to FIG. 7 is a representation of a cryopreservation instrument 400 according to one example embodiment of the present disclosure. The cryopreservation instrument 400 includes a substantially planar elongated member 403 that has a first end 405 and a second end 407. The first end 405 includes a cap insert 409 that is dimensioned and configured to be fit in the interior recess 211 of a vial cap 203. The second end 407 includes a biological contact portion 411 configured to accommodate, receive, support, and/or hold biological material. The contact portion 411 is substantially symmetrically located between parallel and coplanar first and second guides, 413 and 415, respectively that extend away with the contact portion from the elongated member 403.

While the shown elongated member 403 is substantially planar, other configurations are also possible. For example, the elongated member may be a curved, bent, elliptical or other shape. The guides 413 and 415 are coplanar with the elongated member 403, while the contact portion 411 is coplanar with the guides at a first side 428 only because of an arcuate surface 422 extending away from the planar surface of the elongated member.

As shown in FIG. 7, the cap insert 409 includes a first parallel projection 416 and a second parallel projection 417, which extend from the first end 405 of the elongated member 403. The parallel projections (416 and 417) are substantially parallel to each other and void 419 is defined between the parallel projections (416 and 417). The parallel members projections (416 and 417) are also coplanar with each other and the elongated member 403. The void 419 may allow the projections 416 and 417 to flex in or out to better fit into a cap 203 as further discussed.

The cap insert 409 may, however, be in any configuration suitable to form a tight or secure fit in the interior recess of a vial cap. For example, the cap insert 409 may be a single, solid projection, which may or may not be planar with the elongated member 403. The cap insert 409 may include at least a portion which has a width greater than an internal diameter of a vial cap that it is to be inserted in, yet deformable to make a relatively snug fit.

Upon insertion of the cap insert 409, the vial cap 203 will engage the cap insert in a removably receivable manner. The cap insert 409 should be securely engaged with the cap 203 to prevent dislodgment without substantial force. In this regard, once inserted into a vial cap 203, the cap insert should form a friction fit, slip fit, snap fit, or the like. The fit may be oppositely biased. Once fit, the cryopreservation instrument 400 should require significant force, i.e., more than minimal, to be adjusted or moved. However, removal and reuse of the cryopreservation instrument 400 is expected.

Shown in FIG. 7, the biological contact portion 411 may be a thin tip, capable of accommodating any biological material for cryopreservation or vitrification. The biological contact portion 411 may be any structure capable of accommodating a biological material including, without limitation a thin tip, a vitrification spatula, a loop, a mesh, a net, and/or a straw.

The cryopreservation instrument 400 may be formed from any material suitable for cryopreservation and vitrification. It may be a single material or multiple materials. For example, the biological contact portion 411 may be a different material than the rest of the elongated member 403. Likewise, the cap insert 409 may be the same material or a different material than the rest of the elongated member 403.

The construction and positioning of the cap insert 409 into the recess portion 211 of the cap 203 allows the contact portion 411 to remain substantially centrally located within the receptacle 205. Thus a reduction of contamination to the contact portion 411 is advantageously mitigated. Contamination to the contact portion 411 is further mitigated by the use of the first and second guides, 413 and 415 that contact the inner sides of the receptacle 205. That is, the diameter "d" of the guides 413 and 415 is such to provide a slip-like lit with the inner diameter of the of the internal thread 209 of the receptacle 205. Thus, the guides 413 and 415 prevent the contact portion 411 from ever contacting the inner walls of the receptacle 205.

EXAMPLES

Example 1

The cryopreservation instrument 101 as illustrated in FIG. 1 was used to perform the procedure described in example 1. The results of example 1 validate the mechanical advantages of the instrument 101, reducing time required to perform the procedure compared to traditional instruments, increased reproducibility, and reduced risk of losing the device 101 during handling. To evaluate the efficacy of vitrifying preimplantation embryos on a cryovial device 101, morulae were harvested from super-ovulated and mated C57BL/6J females and were vitrified as follows. After ~20 embryos were incubated in previtrification and vitrification solutions [Ethylene glycol (Cat. no. 102466; Sigma-Aldrich, St. Louis, Mo., USA), DMSO (Cat. no. D2650; Sigma-Aldrich), Ficoll PM70 (Cat. no, F2878; Sigma-Aldrich), and M2 medium (Cat. no. MR-010P-5F; Specialty Media, Phillipsburg, N.J., USA)] (each for 30 s), the embryos were loaded onto the surface of a cryopreservation instrument (referred to herein as a vitrification using a cryopreservation instrument or device 101 of FIG. 1 with approximately 0.5 μL vitrification solution and cooled down by dipping the droplet into LN2 by holding the attached eryovial caps. The device 101 was then inserted into a precooled cryogenic vial and stored in a LN2 cell storage vessel for 1-3 months before their viability was assessed. The embryos were then thawed and released from the device 101 by dipping the tip containing the droplet into 200 μL of 0.5 M sucrose solution. After the embryos had fallen from the device 101, they were transferred to a droplet of 100 μL 0.5 M sucrose solution and then 100 μL 0.25 M sucrose solution (each for 2 min) to remove the vitrification medium. The embryos were then washed sequentially through three drops of M2 medium and then transferred to KSOM medium (Special Media) for in vitro survival tests and subsequently implanted into pseudopregnant recipients for in vivo survival tests.

In a trial of 32 mouse strains cryopreserved with this protocol, 31 were recovered and rederived as live strains. Recovery of embryos from the CID was 99%. Development to the blastocyst stage was comparable to other cryovial freezing protocols.

Example 2

Validation of Cryofork Vitrification Device: Comparison with Hand-Made Cryospatula A trial to identify any device-related effects after embryo vitrification using device of the design shown in FIG. 1 was conducted as described herein.

Female C56BL/6J mice (3-4 weeks of age) were superovulated to induce ovulation and mated with stud males to fertilize the oocytes. Embryos were recovered at the 8-cell stage and vitrified using Ethylene glycol based cryoprotectant media. Embryos were stored up to several months in vapor phase liquid nitrogen.

Table 1, below, details the outcome of two trials freezing 8-cell mouse embryos with a cryopreservation device according to the present subject matter.

TABLE 1

| Trial | Number of Embryos Frozen | Number of Embryos Recovered (% frozen) | Blastocysts | % B/R |
|---|---|---|---|---|
| 1 | 36 | 33 (92) | 29 | 80.56 |
| 2 | 37 | 34 (92) | 30 | 81.08 |

This data represents procedures performed by several operators. As represented by the high percentage of development to the blastocyst stage, a high percentage of viable embryos were recovered post-thaw.

Example 3

In a preliminary test, the efficacy of the cryopreservation instrument 101 and corresponding vial, similar to the cryotool 301 illustrated in the example embodiment of FIG. 3 with the combination of FIG. 1. During the preliminary test, the cryopreservation instrument 101 was used and proved to be effective based on a successful transfer defined by the viability of frozen embryos and their survival after implantation into pseudopregnant recipients.

The preliminary test included forty-eight (48) morula, which were thawed and cultured overnight. The embryos were then transferred into three female pseudopregnant mice. The first female received 14 embryos, the second female received 16 embryos, and the third received 18 embryos. Seven live pups were delivered from the first female, seven from the second, and six from the third, all such recoveries occurred at approximately eighteen (18) days after the transfer.

All publications cited in the specification are indicative of the level of skill of those skilled in the art to which the presently described subject matter pertains. All of these publications are hereby incorporated by reference herein to the same extent as if each individual publication were specifically and individually indicated as being incorporated by reference.

The present subject matter being thus described, it will be apparent that the same may be modified or varied in many ways. Such modifications and variations are not to be regarded as a departure from the spirit and scope of the present subject matter, and all such modifications and variations are intended to be included within the scope of the following claims.

What is claimed:

1. A cryopreservation instrument, comprising:
a substantially planar elongated member comprising a cryosafe material, the elongated member having a first end and a second end,
the first end comprising a vial cap insert dimensioned and configured to be fit in and removed from an interior recess of a vial cap, the second end comprising a biological contact portion configured to accommodate biological material, wherein the vial cap insert comprises two or more permanently spaced projections that extend independently of one another from the first end when inserted into the vial cap, at least one projection of said projections extending co-axially with the elongated member, wherein the two or more permanently spaced projections comprise interior faces that partially define the interior recess, the interior faces opposite exterior faces each comprising a planar surface, further wherein the vial cap insert defines a void therebetween said two or more permanently spaced projections.

2. The cryopreservation instrument of claim 1, wherein the two or more permanently spaced projections comprises two or more parallel projections extending from the first end the elongated member, the two or more substantially parallel projections being substantially coplanar with the elongated member.

3. The cryopreservation instrument of claim 2, wherein the substantially parallel projections define the void therebetween, the void being coplanar with the elongated members.

4. The cryopreservation instrument of claim 1, wherein the vial cap insert comprises at least a portion having a width greater than an internal diameter of the vial cap to be used during installation.

5. The cryopreservation instrument of claim 4, wherein the vial cap insert is deformable under pressure sufficient to allow insertion of the vial cap insert in the interior recess of the vial cap during installation.

6. The cryopreservation instrument of claim 5, wherein the vial cap insert comprises a resilient, deformable or elastic material.

7. The cryopreservation instrument of claim 1, wherein the cryosafe material is one or more material selected from the group consisting polycarbonate, polystyrene, polypropylene, glass, acrylic, aluminum, beryllium copper, stainless steel, Teflon® (polytetrafluoroethylene), a polyamide, low-density polyethylene (LDPE), low-density polyethylene (HDPE), polyethylene terephthalate (PET), polyethylene terephthalate glycol-modified (PETG), ultra-high-molecular-weight polyethylene (UHMWPE), a silicone based polymer, Diphenylmethylsilyl ether (DPMS), polychlorotrifluoroethylene PCTFE and polyimides, and combinations thereof.

8. The cryopreservation instrument of claim 1, wherein the biological contact portion is selected from the group consisting of a thin tip, a vitrification spatula, a loop, a mesh, a net, and a straw.

9. A cryopreservation instrument, comprising:
a reusable substantially planar elongated member comprising a first end being dimensioned and configured to be removably receivable within a recess portion of a cap, the first end comprising at least two spaced apart projections extending from the first end, the at least two spaced apart projections defining a void therebetween and defining independent structures when inserted into the cap, the at least two spaced apart projections comprising at least two spaced apart parallel projections extending in a common direction away from the first end, the at least two spaced apart parallel projections defining respective exterior surfaces opposite the void, the exterior surfaces being planar; and
a second end configured to receive a biological specimen, the first end and second end defining an axis.

10. The cryopreservation instrument of claim 9, the projections being parallel to the substantially planer elongated member and coplanar therewith, wherein the parallel projections during installation engage a recess portion of a cap with an oppositely biased friction fit, further wherein, the parallel projections remain substantially parallel to each other when inserted into the cap.

11. The cryopreservation instrument of claim 9, wherein the projections are independently yieldable and resilient, and integral with the elongated member.

12. A method of preserving a sample, comprising:
providing a cryopreservation instrument comprising a substantially planar elongated member having a first end and a second end, the first end comprising a cap insert dimensioned and configured to be fit in the interior recess of a vial cap, the second end comprising a biological contact portion configured to accommodate biological material and at least two guides;
inserting the cap insert, into an externally threaded vial cap comprising an interior recess to produce a cryo-tool having a cap end and the biological contact portion;
loading biological material onto the biological contact portion of the cryo-tool, the biological contact portion spaced from the at least two guides;
placing the biological contact portion of the cryo-tool into liquid nitrogen to obtain cryopreserved biological material;
maintaining the cryopreserved biological material on the cryo-tool and placing the cryo-tool into an internally threaded vial being threadably engagable with the vial cap;
allowing the cryopreserved biological material to equilibrate with the conditions in the vial; and
screwing the vial cap onto the vial to obtain a sealed vial.

13. The method according to claim 12, wherein the biological material is exposed to a cryopreservation solution prior to being placed in liquid nitrogen.

14. The method according to claim 13, wherein the cryopreservation solution comprises a balanced salt solution.

15. The method according to claim 13, wherein the cryopreservation solution comprises at least one cryoprotectant.

16. The method according to claim 15, wherein the cryoprotectant is an intracellular cryoprotectant selected from the group consisting of DMSO, glycerol, ethylene glycol, polyethylene glycol, 1,2-propanediol, formamide.

17. The method according to claim 15, wherein the cryoprotectant is an extracellular cryoprotectant selected from the group consisting of sugars, proteins and carbohydrates.

18. The method according to claim 12, wherein the cap insert comprises two or more substantially parallel projections extending from the first end of the elongated member, the two or more substantially parallel projections being substantially coplanar with the elongated member.

19. The method according to claim 18, wherein the substantially parallel projections define a void therebetween.

20. The method according to claim 12, wherein the cap insert comprises at least a portion having a width greater than an internal diameter of the cap.

21. The method of claim 20, wherein inserting further comprises inserting the cap insert under pressure into the interior recess of the vial cap such that the cap insert deforms under pressure sufficient to allow insertion of the cap insert into the interior recess of the vial cap.

22. The method of claim 12, wherein the cap insert comprises a resilient, deformable or elastic material.

23. The method of claim 12, further comprising storing the sealed vial in liquid nitrogen or liquid nitrogen vapor.

24. A cryopreservation instrument, comprising:
a substantially planar elongated member comprising a cryosafe material, the elongated member having a first end and a second end,
the first end comprising a cap insert dimensioned and configured to be fit in the interior recess of a vial cap, the second end comprising a biological contact portion configured to accommodate biological material; and
the second end further comprising substantially parallel first and second guides symmetrically spaced from said biological contact portion.

* * * * *